(12) United States Patent
Pan

(10) Patent No.: US 7,969,537 B2
(45) Date of Patent: Jun. 28, 2011

(54) LIQUID CRYSTAL PANEL WITH STATIC ELECTRICITY DAMAGE PREVENTION

(75) Inventor: Zi-Sheng Pan, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 192 days.

(21) Appl. No.: 12/284,365

(22) Filed: Sep. 22, 2008

(65) Prior Publication Data

US 2009/0079917 A1    Mar. 26, 2009

(30) Foreign Application Priority Data

Sep. 21, 2007 (CN) .......................... 2007 1 0077344

(51) Int. Cl.
*G02F 1/1333* (2006.01)
*G02F 1/1345* (2006.01)

(52) U.S. Cl. ........................................ 349/110; 349/149

(58) Field of Classification Search .................. 349/110, 349/111

See application file for complete search history.

(56) References Cited

U.S. PATENT DOCUMENTS

| 5,615,030 | A | 3/1997 | Harada et al. | |
|---|---|---|---|---|
| 5,907,379 | A * | 5/1999 | Kim et al. ...................... | 349/141 |
| 6,771,342 | B1 * | 8/2004 | Hirakata et al. .............. | 349/141 |
| 7,388,632 | B2 * | 6/2008 | Kim .............................. | 349/110 |
| 2003/0202148 | A1 * | 10/2003 | Ashizawa et al. ............. | 349/139 |
| 2007/0024315 | A1 | 2/2007 | Kim et al. | |

* cited by examiner

*Primary Examiner* — David Nelms
*Assistant Examiner* — David Y Chung
(74) *Attorney, Agent, or Firm* — Wei Te Chung

(57) ABSTRACT

An exemplary liquid crystal panel includes a top substrate and a bottom substrate, a liquid crystal layer positioned between the top substrate and the bottom substrate, and a black matrix unit formed on a bottom surface that is adjacent to the liquid crystal layer of the top substrate. The black matrix includes an insulating layer and a grounded conductive layer between the bottom surface of the top substrate and the insulating layer.

17 Claims, 2 Drawing Sheets

LIQUID CRYSTAL PANEL WITH STATIC ELECTRICITY DAMAGE PREVENTION

CROSS-REFERENCE TO RELATED APPLICATION

This application is related to, and claims the benefit of, a foreign priority application filed in China as Serial No. 200710077344.2 on Sep. 21, 2007. The related application is incorporated herein by reference.

FIELD OF THE INVENTION

The present disclosure relates to a liquid crystal panel, and particularly to a liquid crystal panel that includes a static electricity damage prevention.

GENERAL BACKGROUND

Recently, liquid crystal panels that are light and thin and have low power consumption have been widely used in office automation equipment, video units, and the like.

Generally, when the liquid crystal panel is in use, high-voltage static electricity is liable to be generated and interrupts the liquid crystal panel. If the high-voltage static electricity is discharged on a common electrode of the liquid crystal panel, high-strength instantaneous current may be generated and transmitted to a driving circuit of the liquid crystal panel. When this occurs, the driving circuit is liable to be damaged by the high-strength instantaneous current. Furthermore, much inductive charge may be caused on the common electrode due to the high-voltage static electricity, which can also form the high-strength instantaneous current. Accordingly, the liquid crystal panel may fail to work normally, and has an impaired reliability.

What is needed, therefore, is a liquid crystal panel that can overcome the above-described deficiencies.

SUMMARY

In one preferred embodiment, a liquid crystal panel includes a top substrate and a bottom substrate, a liquid crystal layer positioned between the top substrate and the bottom substrate, and a black matrix unit formed on a bottom surface that is adjacent to the liquid crystal layer of the top substrate. The black matrix includes an insulating layer and a grounded conductive layer between the bottom surface of the top substrate and the insulating layer.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION

Reference will now be made to the drawings to describe various embodiments of the present disclosure in detail.

Figure 1:
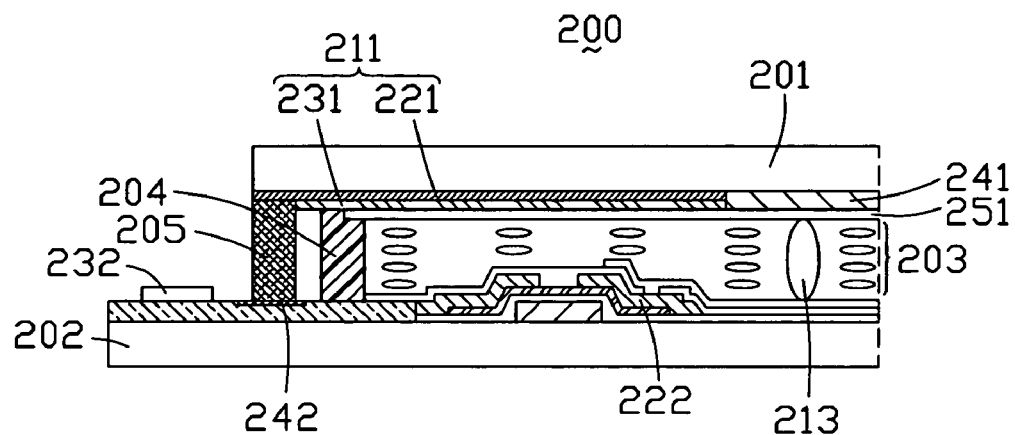
FIG. 1 is a side, cross-sectional view of a part of a liquid crystal panel according to a first embodiment of the present disclosure.

Referring to FIG. 1, a liquid crystal panel 200 according to a first embodiment of the present disclosure is shown. The liquid crystal panel 200 includes a top substrate 201, a bottom substrate 202, a liquid crystal layer 203, a sealant 204, and a plurality of conductive blocks 205. The sealant 204 adheres peripheral regions of the top substrate 201 and the bottom substrate 202, thus defining a housing (not labeled) therebetween. The liquid crystal layer 203 and a plurality of spacers 213 (only one shown) are received in the housing, and the spacers 213 space the top substrate 201 and the bottom substrate 202. The top substrate 201 and the bottom substrate 202 are both transparent, and are generally made from glass or quartz. The liquid crystal layer 203 is positioned between the top substrate 201 and the bottom substrate 202.

A plurality of black matrix units 211 (only one shown) and a plurality of color filter units 241 (only one shown) are formed on a bottom surface (not labeled) that is adjacent to the liquid crystal layer 203 of the top substrate 201. Every two adjacent color filter units 241 are spaced from each other by the respective black matrix unit 211 therebetween. A transparent common electrode 251 covers the back matrix units 211 and the color filter units 241, and is in direct contact with the liquid crystal layer 203.

Each of the black matrix units 211 includes an insulating layer 231 and a conductive layer 221. The insulating layer 231 is positioned between the conductive layer 221 and the common electrode 251. The conductive layer 221 is in direct contact with the bottom surface of the top substrate 201, and is made from a black conductive material.

A plurality of thin film transistors 222 (TFT, only one shown), a driving chip 232, and a ground wire 242 are formed on a top surface (not labeled) that is adjacent to the liquid crystal layer 203 of the bottom substrate 202, respectively. The TFTs 222 are received in the housing, and are vertically aligned with the black matrix units 211, respectively. The driving chip 232 is arranged outside the housing, and is electrically connected to the TFTs 222 and the common electrode 251 via a plurality of signal lines (not shown) and data lines (not shown).

Figure 2:
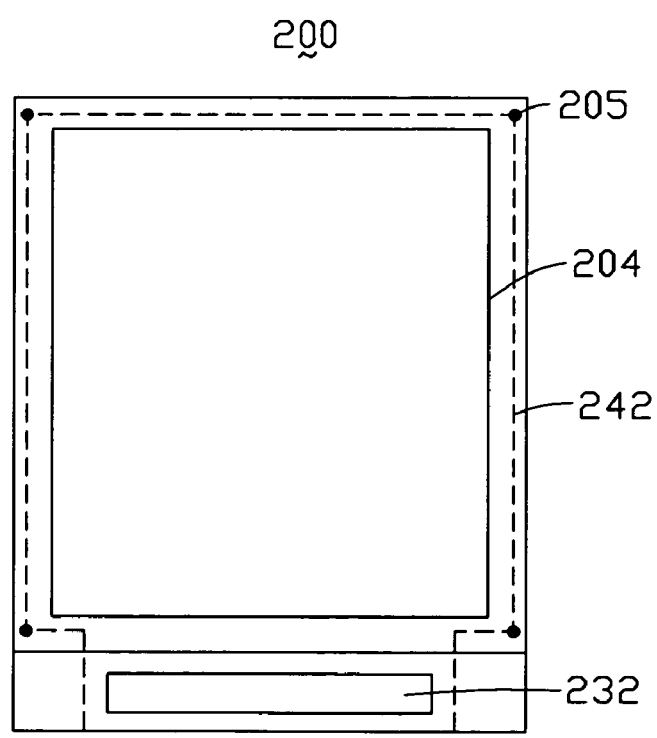
FIG. 2 is a top, plan view of the liquid crystal panel of FIG. 1.

Referring also to FIG. 2, the ground wire 242 surrounds the sealant 204 and the driving chip 232. The conductive blocks 205 are arranged at peripheral corners (not labeled) of the liquid crystal panel 200. Each conductive block 205 includes one end (not labeled) electrically connected to the ground wire 242, and the another end (not labeled) getting through the insulating layer 231 of the respective black matrix unit 211 and directly abutting the conductive layer 221 of the respective black matrix unit 211.

With the above-described configurations, the conductive layers 221 of the respective black matrix units 211 are grounded via the ground wire 242. Therefore, high-voltage static electricity applied to the conductive layers 221 of the respective black matrix units 211 is conducted to ground via the conductive blocks 205 and the ground wire 242. Furthermore, the grounded conductive layers 221 define a static electricity shield around the common electrode 251, thus avoiding generating inductive charge of the common electrode 251. Furthermore, the conductive blocks 205 are arranged at the peripheral corners where static electricity is most likely to be gathered thereat. Thus, the driving chip 232 is protected from being damaged by high-strength instantaneous current, and the liquid crystal panel 200 can work more reliably.

Figure 3:
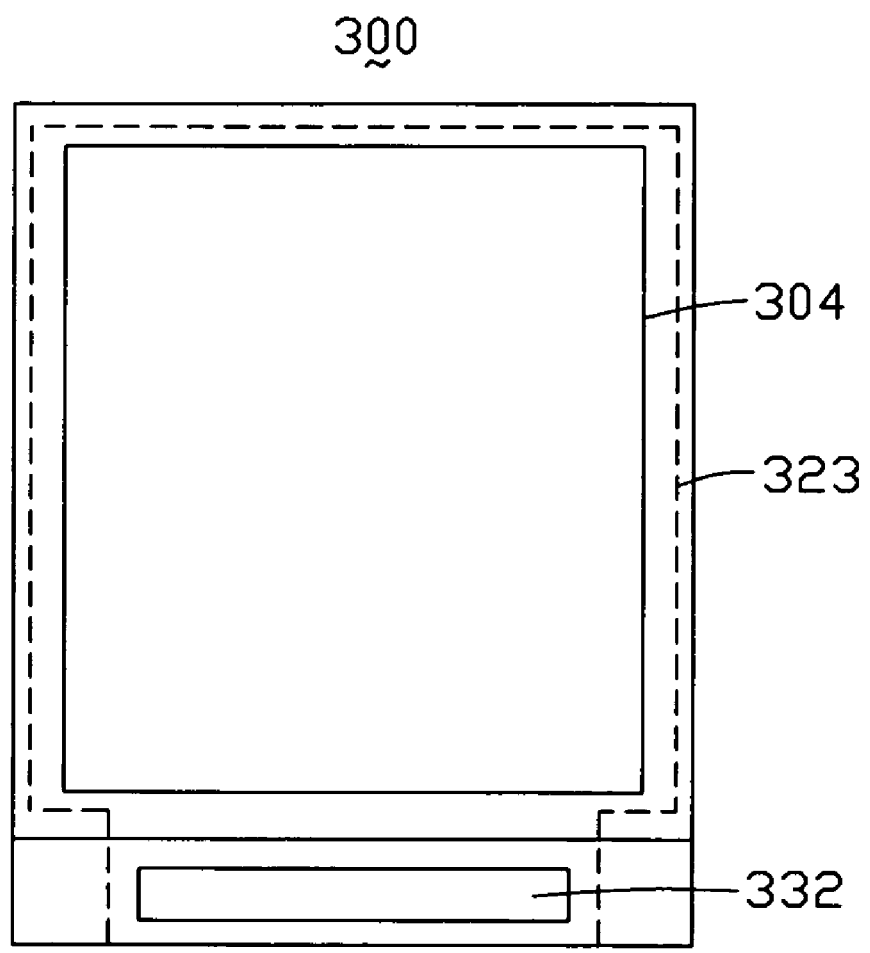
FIG. 3 is a top, plan view of a liquid crystal panel according to a second embodiment of the present disclosure.

Referring to FIG. 3, a liquid crystal panel 300 according to a second embodiment of the present disclosure is shown. The liquid crystal panel 300 is similar to the liquid crystal panel 200 except that a plurality of conductive side walls 323 are employed in the liquid crystal panel 300 to replace the conductive blocks 205 and the ground wire 242 of the liquid crystal panel 200. The conductive side walls 323 are connected end to end, and surround a sealant 304 and a driving chip 332 of the liquid crystal panel 300. The conductive side walls 323 can be directly grounded or be indirectly grounded via an external circuit (not shown) to maintain a zero electric potential. The conductive side walls 323 are electrically connected to portions of conductive layers (not shown) of black matrix units (not shown) of the liquid crystal panel 300. The conductive side walls 323 are located adjacent to the sealant 304, which somewhat improves a mechanical strength of the liquid crystal panel 300. In other respects, the liquid crystal panel 300 has advantages similar to those described above in relation to the liquid crystal panel 200.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A liquid crystal panel comprising:
   a top substrate and a bottom substrate;
   a liquid crystal layer positioned between the top substrate and the bottom substrate;
   a sealant adhering the top substrate and the bottom substrate so as to define a housing between the top substrate and the bottom substrate;
   a black matrix unit formed on a bottom surface that is adjacent to the liquid crystal layer of the top substrate; and
   a driving chip and a ground wire formed on a top surface that is adjacent to the liquid crystal layer of the bottom substrate, respectively, wherein the driving chip and the ground wire are outside the housing;
   wherein the black matrix unit comprises an insulating layer and a grounded conductive layer between the bottom surface of the top substrate and the insulating layer.

2. The liquid crystal panel of claim 1, further comprising a common electrode covering the black matrix unit, wherein the common electrode is in direct contact with the liquid crystal layer.

3. The liquid crystal panel of claim 2, wherein the insulating layer is positioned between the conductive layer and the common electrode.

4. The liquid crystal panel of claim 1, wherein the ground wire surrounds the housing and the driving chip.

5. The liquid crystal panel of claim 1, further comprising a conductive block arranged at a peripheral corner of the bottom substrate, wherein the conductive block is electrically connected to the ground wire.

6. The liquid crystal panel of claim 5, wherein the conductive block comprises one end electrically connected to the ground wire, and another end penetrating the insulating layer and directly abutting the conductive layer of the black matrix unit.

7. The liquid crystal panel of claim 1, further comprising a plurality of grounded conductive side walls surrounding the driving chip and the sealant.

8. A liquid crystal panel comprising:
   a top substrate and a bottom substrate;
   a liquid crystal layer positioned between the top substrate and the bottom substrate;
   a sealant adhering the top substrate and the bottom substrate so as to define a housing between the top substrate and the bottom substrate;
   a black matrix unit formed on a bottom surface that is adjacent to the liquid crystal layer of the top substrate;
   a common electrode covering the black matrix unit; and
   a driving chip and a ground wire formed on a top surface that is adjacent to the liquid crystal layer of the bottom substrate, respectively, wherein the driving chip and the ground wire are outside the housing;
   wherein the black matrix unit comprises a conductive layer and an insulating layer positioned between the conductive layer and the common electrode, and the conductive layer is adjacent to the top substrate, and defines a static electricity shield around the common electrode.

9. The liquid crystal panel of claim 8, wherein the ground wire surrounds the housing and the driving chip.

10. The liquid crystal panel of claim 8, further comprising a conductive block arranged at a peripheral corner of the bottom substrate, wherein the conductive block is electrically connected to the ground wire.

11. The liquid crystal panel of claim 10, wherein the conductive block comprises one end electrically connected to the ground wire, and another end penetrating the insulating layer and directly abutting the conductive layer of the black matrix unit.

12. The liquid crystal panel of claim 8, further comprising a plurality of grounded conductive side walls surrounding the driving chip and the sealant.

13. A liquid crystal panel comprising:
   a top substrate and a bottom substrate;
   a liquid crystal layer positioned between the top substrate and the bottom substrate;
   a sealant adhering the top substrate and the bottom substrate so as to define a housing between the top substrate and the bottom substrate;
   a black matrix unit formed on a bottom surface of the top substrate, the bottom surface adjacent to the liquid crystal layer;
   a common electrode covering the black matrix unit; and
   a driving chip and a ground wire respectively formed on a top surface of the bottom substrate, the top surface adjacent to the liquid crystal layer, wherein the driving chip and the ground wire are outside the housing;
   wherein the black matrix unit comprises a conductive layer adjacent to the top substrate and an insulating layer positioned between the conductive layer and the common electrode, the conductive layer defines a static electricity shield around the common electrode, and the conductive layer is grounded to maintain a zero electric potential.

14. The liquid crystal panel of claim 13, further comprising a conductive block arranged at a peripheral corner of the bottom substrate.

15. The liquid crystal panel of claim 14, wherein the conductive block comprises one end electrically connected to the ground wire, and another end penetrating the insulating layer and directly abutting the conductive layer of the black matrix unit.

16. The liquid crystal panel of claim 13, further comprising a plurality of grounded conductive side walls surrounding the driving chip and the sealant, wherein the conductive side walls are directly grounded via an external circuit to maintain a zero electric potential.

17. The liquid crystal panel of claim 13, further comprising a plurality of grounded conductive side walls surrounding the driving chip and the sealant, wherein the conductive side walls are indirectly grounded via an external circuit to maintain a zero electric potential.

* * * * *